US011299595B2

(12) United States Patent
Inoue et al.

(10) Patent No.: US 11,299,595 B2
(45) Date of Patent: Apr. 12, 2022

(54) HEAT-SHRINKABLE POLYESTER FILM AND PACKAGE

(71) Applicant: TOYOBO CO., LTD., Osaka (JP)

(72) Inventors: Masafumi Inoue, Tsuruga (JP); Masayuki Haruta, Tsuruga (JP)

(73) Assignee: TOYOBO CO., LTD., Osaka (JP)

( * ) Notice: Subject to any disclaimer, the term of this patent is extended or adjusted under 35 U.S.C. 154(b) by 542 days.

(21) Appl. No.: 15/752,339

(22) PCT Filed: Aug. 4, 2016

(86) PCT No.: PCT/JP2016/072901
§ 371 (c)(1),
(2) Date: Feb. 13, 2018

(87) PCT Pub. No.: WO2017/029999
PCT Pub. Date: Feb. 23, 2017

(65) Prior Publication Data
US 2020/0207934 A1 Jul. 2, 2020

(30) Foreign Application Priority Data
Aug. 19, 2015 (JP) .............................. JP2015-162077

(51) Int. Cl.
| | | |
|---|---|---|
| *C08J 5/18* | (2006.01) | |
| *B29C 48/00* | (2019.01) | |
| *B29C 48/88* | (2019.01) | |
| *B29C 48/08* | (2019.01) | |
| *C08G 63/183* | (2006.01) | |
| *B29K 67/00* | (2006.01) | |
| *B29L 7/00* | (2006.01) | |

(52) U.S. Cl.
CPC ............ *C08J 5/18* (2013.01); *B29C 48/0018* (2019.02); *B29C 48/022* (2019.02); *B29C 48/08* (2019.02); *B29C 48/914* (2019.02); *C08G 63/183* (2013.01); *B29K 2067/00* (2013.01); *B29L 2007/008* (2013.01); *C08J 2367/02* (2013.01); *C08J 2467/02* (2013.01)

(58) Field of Classification Search
CPC ... B29C 48/0018; B29C 48/022; B29C 48/08; B29C 48/914; B29C 61/06; B29K 2067/00; B29L 2007/008; C08G 63/183; C08J 2367/02; C08J 2467/02; C08J 5/18
See application file for complete search history.

(56) References Cited

U.S. PATENT DOCUMENTS

| | | | |
|---|---|---|---|
| 2006/0063008 A1* | 3/2006 | Inagaki | ................. C08J 7/0427 428/423.1 |
| 2009/0227735 A1 | 9/2009 | Shih et al. | |
| 2009/0270584 A1 | 10/2009 | Endo et al. | |
| 2011/0224369 A1 | 9/2011 | Kim et al. | |
| 2015/0175756 A1 | 6/2015 | Haruta et al. | |
| 2016/0137833 A1 | 5/2016 | Haruta et al. | |

FOREIGN PATENT DOCUMENTS

| | | | |
|---|---|---|---|
| EP | 33339000 | * | 6/2018 |
| JP | H08-244114 A | | 9/1996 |
| JP | 2008-274160 A | | 11/2008 |
| JP | 2009-143043 A | | 7/2009 |
| JP | 2009-161625 A | | 7/2009 |
| JP | 2009-227970 A | | 10/2009 |
| JP | 4411556 B2 | | 2/2010 |
| JP | 2011-513550 A | | 4/2011 |
| JP | 2011-184690 A | | 9/2011 |
| WO | WO 2014/021120 A1 | | 2/2014 |
| WO | WO 2014/199787 A1 | | 12/2014 |

OTHER PUBLICATIONS

European Patent Office, Extended European Search Report in European Patent Application No. 16836990.8 (dated Mar. 15, 2019).
Japanese Patent Office, International Search Report in International Patent Application No. PCT/JP2016/072901 (dated Sep. 20, 2016).
Japanese Patent Office, Notice of Reasons for Revocation in Japanese Patent No. 6791310, Opposition No. 2021-700499 (dated Sep. 8, 2021).

* cited by examiner

*Primary Examiner* — Ling Siu Choi
*Assistant Examiner* — Gennadiy Mesh
(74) *Attorney, Agent, or Firm* — Leydig, Voit & Mayer, Ltd.

(57) ABSTRACT

Provided is a heat-shrinkable polyester film which has heat shrinkage properties in a main shrinkage direction in the longitudinal direction, a small variation in shrinkage in the width direction, and less likely generated wrinkles and strains at the time of shrinkage finishing. The polyester film is prepared from a polyester raw material resin comprising 50 mol % or more of an ethylene terephthalate unit in 100 mol % of constituent units of a polyester, diol components selected from aliphatic, alicyclic, and aromatic diols, and an amorphous monomer component that is 2% or more in 100 mol % of either a polyhydric alcohol component or a polybasic carboxylic acid component in the whole polyester resin, wherein the polyester does not contain polybasic carboxylic acids of tribasic or more, and the polyester film is obtained by uniaxial drawing in the longitudinal direction.

4 Claims, 1 Drawing Sheet

HEAT-SHRINKABLE POLYESTER FILM AND PACKAGE

CROSS-REFERENCE TO RELATED APPLICATIONS

This patent application is the U.S. national phase of International Patent Application No. PCT/JP2016/072901, filed Aug. 4, 2016, which claims the benefit of Japanese Patent Application No. 2015-162077, filed on Aug. 19, 2015, which are incorporated by reference in their entireties herein.

TECHNICAL FIELD

The present invention relates to a heat-shrinkable polyester film and a package. More particularly, the present invention relates to a heat-shrinkable polyester film which is suitable for a label application and a banding application to bind a box lunch container or the like, and which has a small difference in physical properties in the width direction of a roll and has a less amount of wrinkles, strains or the like generated at the time of shrinking by heating.

BACKGROUND ART

Recently, in applications such as label package doubling as a protection of a glass bottle and a PET bottle etc. and display of articles, cap sealing, and accumulation package, there have been widely used drawn films (so-called heat-shrinkable films) composed of a polyvinyl chloride resin, a polystyrene resin, a polyester resin or the like. Of these heat-shrinkable films, a polyvinyl chloride film has problems that heat resistance is low, and it generates hydrogen chloride gas in incineration and causes dioxin. A polystyrene film has problems that it is inferior in solvent resistance, as well as an ink with a special composition needs to be used in printing, it requires high temperature incineration and generates a lot of black smoke accompanied by an abnormal odor. Therefore, as a shrink label, there has been widely used a polyester-based heat-shrinkable film which is high in heat resistance, easy to incinerate, and excellent in solvent resistance, and the use amount tends to increase being accompanied by an increase in distribution volume of PET containers.

As an ordinary heat-shrinkable polyester film, one which is allowed to shrink greatly in the width direction has been widely utilized. When the film is used as a label film for a bottle or a banding film for binding a box lunch container or the like, the film should be made into an annular form, mounted to the bottle or the box lunch container or the like, and then allowed to heat-shrink in the circumferential direction. Therefore, when a heat-shrinkable film that heat-shrinks in the width direction is mounted as a banding film, after forming an annular-shaped member such that the width direction of the film is in the circumferential direction, the annular-shaped member should be cut into segments having a predetermined length, and each segment should be mounted to the bottle or the box lunch container, for example, by placing it by hand over the bottle or the box lunch container. Therefore, it is difficult to mount a label or a banding film made of the heat-shrinkable film that heat-shrinks in the width direction to a bottle or a box lunch container at high speed. For that reason, recently, there is a need for a longitudinally heat-shrinkable film which can be wound around a bottle or a box lunch container directly from a film roll to mount the bottle or the box lunch container. With such a heat-shrinkable film, a center sealing step in which an annular-shaped member is formed and sealed or processing such as cutting, placing by hand, or the like can be eliminated, and thus mounting at high speed is also possible.

As one of demands for the shrinkable film, it is desired to have no difference in shrinkage properties in the width direction of the film. In general, when used for a label application and a banding application of a box lunch container, a film is formed and wound as a film roll, and the film is unwound from the film roll, slit to a predetermined width, and wound again as a slit roll. Therefore, if shrinkage properties varies in the width direction of the film, slit rolls with different shrinkages depending on the slit position are obtained. The shrinkage in the width direction is closely related to the height of a label or a banding film used for a label application or banding film application, and therefore when the shrinkage in a direction orthogonal to the main shrinkage direction, namely in the width direction, is different for each slit roll, there is a problem that labels and banding films having different heights are obtained depending on the rolls used. A small variation in shrinkage in the width direction is ideal for making the height of the label or banding film uniform for each slit roll.

A variation in shrinkage in the width direction is considered to be caused by a neck-in phenomenon at the time of lengthwise drawing. When the film is lengthwise drawn, a drawing stress is applied in the lengthwise direction, and a stress directed toward the center of the film also works in the width direction accordingly. This stress applied in the width direction is particularly large in the vicinity of the end parts of the film, and the width of the film decreases during drawing. This phenomenon of a decrease, namely shrinkage, of the width is called neck-in. It is considered that the shrinkage in the width direction in the vicinity of the end parts of the film is smaller than the shrinkage in the width direction in the vicinity of the center of the film, resulting in the occurrence of variation in shrinkage in the width direction of the film.

As another demand for the shrinkable film, it is also desired to have a less amount of strains after shrinkage. It is known that strains after shrinkage are caused by the inclination of the main orientation direction of molecules from the longitudinal direction or the width direction of the film. This inclination is called a molecular orientation angle. In the case of usual lengthwise uniaxial drawing, when the mechanical flow direction is set to the 12 o'clock direction in the central part of the film, an angle formed by the 12 o'clock direction and the molecular chain in the film (hereinafter, simply referred to as a molecular orientation angle) is almost 0 degrees and thus the molecular orientation angle becomes small, whereas the molecular orientation angle in the vicinity of the end parts of the film is large. It is assumed that the reason of the molecular orientation angle getting large in the vicinity of the end parts of the film is also that neck-in occurs at the time of lengthwise drawing. In the vicinity of the center of the film, the molecular orientation angle is small because the influence of neck-in is small. In the vicinity of the end parts of the film, the influence of a force applied in the width direction is large, and the force in the width direction works in addition to a force in the lengthwise direction due to lengthwise drawing, so that the molecular chain inclines and the molecular orientation angle increases. It is ideal for strains after shrinkage that the molecular orientation angle is small over a range from the central part to the end parts of the film.

As a method for obtaining a film having a small variation in shrinkage in the width direction of the film and a small molecular orientation angle, a method can be used in which a part affected by a force in the width direction applied during neck-in is trimmed as a process after lengthwise drawing. However, in this method, a width of the film that can be taken as a product reduces, leading to an increase in cost.

As other methods for obtaining a film having a small variation in shrinkage in the width direction of the film and a small molecular orientation angle, a method of biaxial drawing can be used.

For example, Patent Document 1 describes a film having sufficient shrinkage properties in the longitudinal direction and having a wide width as a product which can be obtained by drawing an undrawn film first two times or more in the width direction and then drawing it in the longitudinal direction. However, in the method described in Patent Document 1, a large scale equipment for biaxially drawing is necessary, which causes a problem of increased cost.

PRIOR ART DOCUMENT

Patent Documents

Patent Document 1: Japanese Patent Publication No. 4411556

SUMMARY OF THE INVENTION

Problems to be Solved by the Invention

An object of the present invention is to provide a heat-shrinkable polyester film which has sufficient heat shrinkage properties in a main shrinkage direction that is the longitudinal direction, in which a variation in shrinkage in the width direct ion is small in the width direction of the film, and wrinkles and strains are less likely to be generated at the time of shrinkage finishing due to a small molecular orientation angle.

Means for Solving the Problem

That is, the present invention has the following constitution.

1. A heat-shrinkable polyester film which satisfies the following requirements (1) to (4):

(1) the film has a hot-water shrinkage of 50% or more in a main shrinkage direction of the film when treated for 10 seconds in hot water of 98° C.

(2) when samples are taken at every 100 mm in a width direction of the film, and hot-water shrinkages in a direction orthogonal to the main shrinkage direction of the film are determined for all the samples when treated for 10 seconds in hot water of 98° C., a variation of the hot-water shrinkages is 5% or less:

(3) an absolute value of a molecular orientation angle is 15 degrees or less; and, (4) a refractive index difference represented by the following equation is 0.06 or more:

Refractive index difference=(Refractive index in the main shrinking direction)−(Refractive index in a direction orthogonal to the main shrinkage direction).

2. The heat-shrinkable polyester film according to claim 1, wherein at least one of neopentyl glycol, cyclohexanedimethanol and isophthalic acid is used in a polyester raw material resin.

3. The heat-shrinkable polyester film according to claim 1 or 2, wherein the main shrinkage direction is a longitudinal direction of the film.

4. A package comprising a label obtained from the heat-shrinkable polyester film according to any of claims 1 to 3 on at least a part of an outer periphery of an object to be packaged.

Effects of the Invention

The present invention thus provides a heat-shrinkable polyester film which has a high shrinkage in the longitudinal direction, in which a variation in shrinkage in a direction orthogonal to the main shrinkage direction, namely in the width direction of the film, is small in the width direction, and a molecular orientation angle is small even if the molecular orientation angle is measured at any point in the width direction of the film. Since a variation in shrinkage in a direction orthogonal to the main shrinkage direction is small in the width direction, a variation in the height of the label or the banding film is extremely small even if a slit film obtained by slitting at any position is used. Moreover, the film has a less amount of wrinkles and strains after shrinking due to a small molecular orientation angle, whereby good finishing can be achieved.

EXPLANATION OF LETTERS OR NUMERALS

1: box lunch container
2: film
3: wrinkle
4: box lunch container (lid part)
5: box lunch container (body part)
6: film

MODE FOR CARRYING OUT THE INVENTION

Hereinafter, the structure of the heat-shrinkable polyester film according to the present invention will be described in detail. A method for producing the heat-shrinkable polyester film will be described in detail later, but the film is usually obtained by transporting and drawing with a roll or the like. Here, the transporting direction of the film is referred to as a longitudinal direction, and a direction orthogonal to the longitudinal direction is referred to as a width direction of the film. Therefore, the width direction of the heat-shrinkable polyester film described below means a direction orthogonal to an unwinding direction of the roll, and the longitudinal direction of the film means a direction parallel to the unwinding direction of the roll. The main shrinkage direction of the heat-shrinkable polyester films obtained in Examples and Comparative Examples is the longitudinal direction.

In order to obtain a film having a high shrinkage in the longitudinal direction that is the main shrinkage direction, a small variation in shrinkage in a direction orthogonal to the main shrinkage direction, and a small molecular orientation angle, uniaxial drawing in the longitudinal direction is employed in view of equipment cost. However, in the usual uniaxial drawing in the longitudinal direction as described above, the neck-in affected part will be cut off in a trimming step after drawing, so that a product width becomes narrow and costs increase. Under the circumstances, the present inventors have made investigations and consequently found that a range affected by a force in the width direction applied during neck-in can be reduced by shortening a drawing distance at the time of uniaxial drawing. The reduced range affected by the force in the width direction applied during neck-in means that the influence of the force in the width direction acting during lengthwise drawing stays in the vicinity of the end parts of the film, and the force hardly reach the vicinity of the center of the film. By reducing the range affected by the force in the width direction, a wide film with a small variation in shrinkage in the direction orthogonal to the main shrinkage direction and a small orientation angle can be obtained.

The polyester used in the heat-shrinkable polyester film of the present, invention contains an ethylene terephthalate unit as a main constituent, and the content of the ethylene terephthalate unit is preferably 50 mol % or more in 100 mol % of the constituent units of the polyester. In order to allow a film to have stiffness, the content of the ethylene terephthalate unit is more preferably 65 mol % or more, and further preferably 70 mol % or more in 100 mol % of the constituent units of the polyester. However, if the content of the ethylene terephthalate unit is too high, it is difficult to obtain a necessary shrinkage, and therefore the upper limit of the content of the ethylene terephthalate unit is preferably 90% or less.

Other dicarboxylic acid components constituting the polyester of the present invention can include aromatic dicarboxylic acids such as isophthalic acid, naphthalenedicarboxylic acid, and ortho-phthalic acid; aliphatic dicarboxylic acids such as adipic acid, azelaic acid, sebacic acid and decanedicarboxylic acid; and alicyclic dicarboxylic acid; or the like.

When an aliphatic dicarboxylic acid (for example, adipic acid, sebacic acid, decanedicarboxylic arid or the like) is contained in the polyester, the content is preferably less than 3 mol % (in 100 mol % of the dicarboxylic acid component).

Further, it is preferable not to contain polybasic carboxylic acids of tribasic or more (for example, trimellitic acid, pyromellitic acid and anhydride thereof etc.) in the polyester. A heat-shrinkable polyester film obtained by using a polyester containing those polybasic carboxylic acids is hard to achieve a necessary high shrinkage.

Diol components constituting the polyester include aliphatic diols such as ethylene glycol, 1,3-propanediol, 1,4-butanediol, neopentyl glycol and hexanediol; alicyclic diols such as 1,4-cyclohexanedimethanol; and aromatic diols such as bisphenol A.

Furthermore, if the polyester has less than 2% of the sum of at least one monomer component that can form an amorphous component in 100 mol % of a polyhydric alcohol component or in 100 mol % of a polybasic carboxylic acid component in the whole polyester resin, it is impossible to obtain a necessary shrinkage, and shrinkage shortage occurs at the time of shrinkage finishing. The content of the amorphous monomer component is 2% or more, preferably 3% or more, more preferably 4% or more, and particularly preferably 5% or more.

Examples of the monomer that can form an amorphous component may include neopentvl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, and hexanediol. Among these, neopentyl glycol, 1,4-cyclohexanedimethanol, or isophthalic acid is preferably used. In addition, ε-caprolactone is also preferably used.

Here, the interpretation of the term "can form an amorphous component" is described in detail.

In the present invention, the "amorphous polymer" specifically refers to the case where no endothermic peak due to fusion is shown in measurement with a differential scanning calorimeter (DSC). Since the crystallization of the amorphous polymer does not substantially proceed, the amorphous polymer cannot be in a crystalline state or has an extremely low degree of crystallinity even when crystallized.

Furthermore, in the present invention, the "crystalline polymer" refers to a polymer other than the above-mentioned "amorphous polymer", that is, the case where an endothermic peak due to fusion is shown in measurement with a differential scanning calorimeter (DSC). The crystalline polymer means a polymer that can be crystallized when heated, has a crystallizable property, or has been already crystallized.

In general, as for a polymer being in a state where a plurality of monomer units are bonded, when the polymer has various conditions such as low stereoregularity of a polymer, poor symmetry of a polymer, a large side chain of a polymer, a large number of branches of a polymer, and low intermolecular cohesion between polymers, the polymer becomes amorphous. However, depending on the existence state, the crystallization sufficiently proceeds, and the polymer may become crystalline. For example, even for a polymer having a large side chain, when the polymer is composed of a single monomer unit, the crystallization of the polymer may sufficiently proceed, and the polymer may become crystalline. For this reason, even if the polymer is composed of the some monomer unit, the polymer can become crystalline or can become amorphous, and therefore in the present invention, the expression "unit derived from a monomer that can form an amorphous component" is used.

The monomer unit in the present invention means a repeating unit constituting a polymer induced from one polyhydric alcohol molecule and one polybasic carboxylic acid molecule, and in the case of ε-caprolactone, means a constituent unit obtained by opening the lactone ring.

When a monomer unit composed of terephthalic acid and ethylene glycol is a main monomer unit constituting a polymer, examples of the above unit derived from a monomer that can form an amorphous component include a monomer unit composed of isophthalic acid and ethylene glycol, a monomer unit composed of terephthalic acid and neopentyl glycol, a monomer unit composed of terephthalic acid and 1,4-cyclohexanedimethanol, and a monomer unit composed of isophthalic acid and butanediol, or the like.

To a resin for forming the heat-shrinkable polyester film of the present invention, according to needs, there can be added various additives, such as waxes, an antioxidant, an antistatic agent, a crystal-nucleation agent, a viscosity reducing agent, a heat stabilizer, a pigment for coloring, a color protection agent, and an ultraviolet absorber.

By adding fine particles as lubricant to a resin for forming the heat-shrinkable polyester film of the present invention, it is preferable to make workability (slipperiness) of the film better. The fine particles can be arbitrarily selected, for example, as inorganic fine particles, silica, alumina, titanium dioxide, calcium carbonate, kaolin, barium sulfate and the like can be listed. As organic fine particles, for example, an acrylic resin particle, a melamine resin particle, a silicone resin particle, a crosslinked polystyrene particle and the like can be listed. The average particle diameter of the fine particles is in a range of 0.05 to 3.0 μm (when measured by coulter counter), and it can be suitably selected according to need.

As a method for compounding the above-described particles in a resin for forming the heat-shrinkable polyester film, for example, they can be added in an arbitrary step in production of the polyester resin, but they are preferably added in a step of esterification, or in a step after completion of ester exchange reaction and before start of poly condensation reaction as slurry dispersed in ethylene glycol etc., followed by carrying out polycondensation reaction. Further, it is also preferably carried out by a method in which slurry of particles dispersed in ethylene glycol, water or the like and raw materials of polyester resin are mixed using a kneading extruder with a vent, or a method in which dried particles and raw materials of polyester resin arc mixed using a kneading extruder.

It is also possible to conduct corona treatment, coating treatment, frame treatment etc. on the heat-shrinkable polyester film of the present invention in order to enhance adhesiveness of film surface.

The heat-shrinkable film of the present invention may be a single-layer film or a laminated film in which resin layers having different resin compositions are laminated.

The laminated film can be produced by a known method used for producing a laminated film, and a feed block method, a multi-manifold method, and the like can be given. For example, in the case of the co-extrusion method, various resin mixtures for forming layers are separately melted using an extruder, merged in a T-die mold equipped with a multi-manifold and extruded, and drawn by a drawing apparatus, whereby a laminated film can be obtained.

Although the form of the laminated film is not particularly limited, for example, a two-type two-layer structure of A/B, a two-type three-layer structure of B/A/B, and a three-type three-layer structure of C/A/B can be exemplified.

[Properties of Meat-Shrinkable Polyester Film of the Present Invention]

When the heat-shrinkable polyester film of the present invention is treated for 10 seconds in no load state in hot water of 98° C., a heat shrinkage in the longitudinal direction which is the main shrinkage direction of the film calculated from the lengths before and after shrinkage according to the following Equation 1 (namely, hot-water heat shrinkage at 98° C.) is 50% or more.

$$\text{Heat shrinkage} = \{(\text{length before shrinkage} - \text{length after shrinkage})/\text{length before shrinkage}\} \times 100 \, (\%) \quad \text{Equation (1)}$$

If the hot-water heat shrinkage in the longitudinal direction at 98° C. is less than 50%, the shrinkage amount is small in the case of using the film as a label or a banding film, so that wrinkles and slack are generated on a label after heat shrinkage, and therefore this is not preferable. The lower limit of the hot-water heat shrinkage in the longitudinal direction at 98° C. is more preferably 55% or more, and further preferably 60% or more.

Furthermore, in the heat-shrinkable polyester film of the present invention, when samples are taken at every 100 mm in the width direction of the film, and hot-water shrinkages in the direction orthogonal to the main shrinkage direction of the film are determined for all the samples when treated for 10 seconds in hot water of 98° C., the variation of the hot-water shrinkages is 5% or less. A method for measuring the variation of the hot-water shrinkages in the direction orthogonal to the main shrinkage direction will be described in detail in Examples.

If the variation of the shrinkages in the direction orthogonal to the main shrinkage direction is 5% or more, when the film is used as labels or banding films, the labels or banding films differ in height depending on which portion in the width direction of the film is used, and this is not preferable. The upper limit of the variation of the shrinkages in the direction orthogonal to the main shrinkage direction is more preferably 4.5% or less, and further preferably 4% or less. As for the lower limit of the variation of the shrinkages in the direction orthogonal to the main shrinkage direction, although a lower variation is preferably, it Is difficult to reduce it to 0% due to the influence of neck-in at the time of lengthwise drawing, and the lower limit is therefore about 2% at the current technical level. There are practically no problems even though the variation of the shrinkages in the direction orthogonal to the main shrinkage direction is 3%.

Furthermore, the heat*shrinkable polyester film of the present invention preferably has a refractive index difference of 0.06 or more between a refractive index in the longitudinal direction that is the main shrinkage direction and a refractive index in the width direction that is a direction orthogonal to the main shrinkage direction, the refractive index difference being represented by the following equation (2).

$$\text{Refractive index difference} = (\text{Refractive index in the main shrinkage direction}) - (\text{Refractive index in a direction orthogonal to the main shrinkage direction}) \quad \text{Equation (2)}$$

The refractive index difference of less than 0.06 means that the molecules are not oriented in the longitudinal direction and the direction orthogonal to the longitudinal direction, or the molecules are oriented in both the longitudinal direction and the direction orthogonal to the longitudinal direction. In the former, since the molecules are not oriented in the longitudinal direction that is the main shrinkage direction, a necessary shrinkage cannot be obtained, and in the latter, since the molecules are also oriented in the direction orthogonal to main shrinkage direction, unnecessary shrinkage in the width direction unfavorably occurs. The lower limit of the refractive index difference is more preferably 0.065 or more, and further preferably 0.070 or more.

Further, in the heat-shrinkable polyester film of the present invention, the absolute value of the molecular orientation angle must be 15 degrees or less. If the absolute value of the molecular orientation angle is more than 15 degrees, strains may be unfavorably generated when the film is wound around a container of a box lunch or the like and is shrunk. The upper limit of the absolute value of the molecular orientation angle is more preferably 13 degrees or less, and further preferably 12 degrees or less. The absolute value of the molecular orientation angle closer to 0 degrees is preferable, but there are no particular problems even if it is one degree. A method for measuring the molecular orientation angle will be described later.

The thickness of the heat shrinkable polyester film of the present invention is not particularly limited, but as a heat-shrinkable film for a label application and a banding application, the thickness is preferably 5 to 100 μm, and more preferably 10 to 95 μm.

The heat-shrinkable polyester film of the present invention is not particularly limited in its production method, but the film can be obtained, for example, by melt-extruding the above-mentioned polyester raw material with an extruder to form an undrawn film and by drawing the undrawn film with a method as shown below.

When a raw material resin is melt-extruded, it is preferable to dry the polyester raw material using a dryer such as a hopper dryer or a paddle dryer, or a vacuum dryer. After the polyester raw material is dried in such a manner, it is melted at a temperature of 200 to 300° C. and extruded into a film form utilizing an extruder. In such an extrusion, an arbitrary conventional method such as a T-die method and a tubular method can be adopted.

Then, the sheet-like molten resin after extrusion is quenched so that an undrawn film can be obtained. As a method for quenching the molten resin, a method in which a molten resin is cast on a rotary drum from a spinneret, and solidified by quenching to obtain a substantially unoriented resin sheet can be suitably adopted.

Further, the obtained undrawn film is drawn in the longitudinal direction under a predetermined condition as described below so that the heat-shrinkable polyester film of the present invention can be obtained. Hereinafter, a preferable drawing to obtain the heat-shrinkable polyester film of the present invention will be described in detail while taking into consideration the difference from a method for drawing a conventional heat-shrinkable polyester film.

[Preferable Drawing Method of Heat-Shrinkable Polyester Film]

An ordinary heat-shrinkable polyester film is produced by drawing an undrawn film in a direction to be shrunk. In the present invention, an undrawn film is uniaxially drawn in the longitudinal direction that is the main shrinkage direction. In the case of usual uniaxial drawing in the longitudinal direction, an undrawn film is introduced into a lengthwise drawing machine in which a plurality of rolls are sequentially installed and heated on a preheating roll (low-speed roll) till the film temperature reaches a predetermined temperature, a low-temperature roll (high-speed roll) having a faster speed than the speed of the preheating roll is provided downstream of the preheating roll, and the film is drawn in the longitudinal direction using the speed difference between the low-speed roll and the high-speed roll. Here, the distance between a point where the film leaves the low-speed roll and a point where the film is in contact with the high-speed roll is called a drawing distance. The drawing distance has a close relationship to neck-in at the time of lengthwise drawing, and the longer the drawing distance is, the larger the range affected by the force in the width direction due to neck-in is. In the present invention, the range affected by the force in the width direction due to neck-in is reduced by reducing the drawing distance.

Among various methods for heating a film before drawing or during drawing, a method for heating a film passing between a low-speed roll and a high-speed roll with an IR heater or a focused IR heater is not preferable because the position of the low-speed roll becomes far from the high-speed roll due to heater equipment, and the drawing distance is widened. As a drawing method in which heating is only conducted on a preheating roll, a method can be used in which a low-speed roll and a high-speed roll are arranged in the horizontal direction, the film is passed on the top of the low-speed roll and the top of the high-speed roll, and the film is drawn while holding it with a nip roll or the like. However, in this method, the distance between a point where the film leaves the low-speed roll and a point where the film is in contact with the high-speed roll is wide, and therefore the range affected by the force in the width direction due to neck-in becomes large. Preferably, by conducting heating only on the preheating roll and by employing a method in which the film is passed on the low-speed roll and the high-speed roll in a crossed state (for example, a method in which the film is passed on the top of the low-speed roll and passed under the bottom of the high-speed roll), the drawing distance is extremely shorten. At this time, the drawing distance is preferably 100 mm or less, more preferably 80 mm or less, and further preferably 60 mm or less.

Based on the results of studies as described above, the draw ratio in the longitudinal direction is preferably 2.5 times or more and 7 times or less. It is not preferable that the draw ratio in the longitudinal direction be less than 2.5 times because it is difficult to obtain a necessary shrinkage, and the irregularity of thickness in the lengthwise direction of the film increases. If the upper limit of the lengthwise draw ratio is more than 7 times, a degree of neck-in increases, a variation in shrinkage in the width direction becomes large, an orientation angle becomes large, and in addition, drawing in the longitudinal direction becomes difficult (so-called breakage tends to occur), and therefore this is not preferable. The draw ratio is more preferably 2.7 times or more and 6.5 times or less, and further preferably 3 times or more and 6 times or less.

Multi-stage drawing can be used for drawing in the longitudinal direction. For example, in two-stage drawing, a roll (medium-speed roll) having a faster speed than a speed of the low-speed roll and a slower speed than a speed of the high-speed roll is placed between the low-speed roll and the high-speed roll, a first stage drawing is performed between the low-speed roll and the medium-speed roll, and a second stage drawing is performed between the medium speed roll and the high-speed roll. Compared with one-stage drawing in which drawing is performed only between the low-speed roll and the high-speed roll, the drawing distance inevitably becomes long in the multi-stage drawing, and therefore, the upper limit of the total draw ratio in drawing at the first stage and the second stage is preferably 6 times or less, more preferably 5.5 times or less, and further preferably 5.0 times or less. The cumulative drawing distance of the drawing distances at the first stage and the second stage is preferably 200 mm or less, more preferably 180 mm or less, and further preferably 160 mm or less.

The package of the present invention is a package in which a banding film (and a label) obtained by using the heat-shrinkable polyester film of the present invention is covered at least on a part of the outer periphery of an object to be packaged and then to shrink by heat. The object to be packaged can be exemplified by PET bottles for beverage, various kinds of bottles, cans, plastic containers for confectionary, a box lunch and the like, paper-made boxes, and the like. In general, in the case where a label obtained by using a heat-shrinkable polyester film is covered on the packaging object and heat-shrunk, the banding film (and a label) is heat-shrunk by about 5 to 70% and closely attached on the package. Additionally, a banding film (and a label) covered on a packaging object may be printed or may not be printed.

A method for producing a banding film (and a label) is as follows; a rectangular film is rounded in the longitudinal direction to stack the end parts and bonded into a label-form, or a film wound as a roll is rounded in the longitudinal direction of the roll to stack the end parts and bonded into a tube-form, which is cut into a label. As a method for bonding the films together, a known method such as fusion sealing, solvent bonding, bonding with hot*melt adhesive, and bonding with an energy ray-curable adhesive can be used.

EXAMPLES

Hereinafter, the present invention is described in more detail by Examples, but the present invention is by no means limited to aspects of the Examples, and it can be suitably modified in the range not departing from the scope of the present invention. The composition of the raw materials used in Examples and Comparative Examples is shown in Table 1. The ratio of the mixed raw material used in each layer is shown in Table 2. The production condition and the result of the evaluation for the films of Examples and Comparative Examples are shown in Table 3.

Evaluation methods for films are as follows. In the following Examples, the term "film" represents a film sample before heat-shrinking unless otherwise noted.

[Tg (Glass Transition Point)]

Tg was obtained based on JIS-K 7121-1987 using a differential scanning calorimeter (manufactured by Seiko Instruments Inc., DSC220). 5 mg of an undrawn film was put in a sample pan, the lid of the pan was closed, and the temperature was raised at a temperature rising speed of 10° C./minute from −40° C. to 120° C. in a nitrogen gas atmosphere to conduct measurement. Then the rising profile was obtained. The temperature at an intersection of an extended line of the baseline below the glass transition temperature and a tangential line showing the maximum gradient in the transition part was defined as a glass transition temperature.

[Intrinsic Viscosity (IV)]

0.2 g of a polyester was dissolved in 50 ml of a solvent mixture of phenol/1,1,2,2-tetrachloroethane (60/40 (weight ratio)), and the intrinsic viscosity was measured at 30° C. using an Ostwald viscometer. The unit is dl/g.

[Heat Shrinkage (Hot-Water Heat Shrinkage)]

A film was cut into a square of 10 cm×10 cm, dipped in hot water of 98° C.±0.5° C. in no load state for 10 seconds to be heat-shrunk, then dipped in water of 25° C.±0.5° C. for 10 seconds, and taken from water. Then, the dimensions of the film in the lengthwise and transverse directions were measured, and heat shrinkage each was obtained according to the following Equation 1. The direction with the large heat shrinkage was defined as a main shrinkage direction.

Heat shrinkage={(length before shrinkage−length after shrinkage)/length before shrinkage}×100 (%)      Equation 1

[Variation in Shrinkage (Hot-Water Heat Shrinkage)]

Square samples having a dimension of 10 cm×10 cm were taken at 10 cm pitch from one edge to the other edge in the width direction (in a direction orthogonal to the main shrinkage direction) of the film, and a shrinkage in the width direction of each sample was measured according to the above equation (1). The difference between the maximum value and the minimum value for the shrinkage in the width direction of each sample measured by the above method was defined as a variation in shrinkage.

[Molecular Orientation Angle]

The molecular orientation axis in the present invention refers to a direction in which the degree of molecular orientation is the largest when observed in an X-Y plane, wherein an X axis is the longitudinal direction of the film, a Y axis is the width direction of the film, and a Z axis is the thickness direction of the film. The molecular orientation angle is defined as an angle between the axis of the longitudinal direction of the film or the axis of the width direction of the film and the observed molecular orientation axis. The method for measuring the molecular orientation angle is as follows. Rectangular samples having a dimension of the longitudinal direction×the width direction=140 mm×100 mm are cut out from a film. The molecular orientation angle (angle of the molecular orientation axis direction) of each of the cut out film samples is measured with a molecular orientation angle measuring device (MOA-6004) manufactured by Oji Scientific Instruments. As for the molecular orientation angle, the angle of the longitudinal direction of the film is set to 0 degrees, and when the angle of the molecular orientation axis direction is smaller than 45 degrees with respect to the longitudinal direction, the difference from 0 degrees is measured, and when the angle of the molecular orientation axis direction is larger than 45 degrees with respect to the longitudinal direction, the difference from 90 degrees is measured. The measurement of the molecular orientation angle by the above method was carried out for all the rectangular samples taken at 10 cm pitch from one edge to the other edge in the width direction of the film, and the maximum absolute value of the measured molecular orientation angles was defined as "an absolute value of the molecular orientation angle" in the present invention.

[Refractive Index]

After each sample film was left in an atmosphere of 23° C. and 65% RH for two hours or longer, a refractive index at the sodium D line (wavelength: 589.3 nm) was measured for both in the main shrinkage direction and in a direction orthogonal to the main shrinkage direction of the film using "Abbe refractometer 4T type" manufactured by Atago Co. Ltd. As indicated in the following equation (3), the value obtained by subtracting the refractive index in the direction orthogonal to the main shrinkage direction (the width direction of the film) from the refractive index in the main shrinking direction (the longitudinal direction of the film) was defined as "a refractive index difference."

Refractive index difference=(Refractive index in the main shrinking direction)−(Refractive index in a direction orthogonal to the main shrinkage direction)      Equation (3)

[Shrinkage Finishing Property (Wrap Round)]

Figure 1:
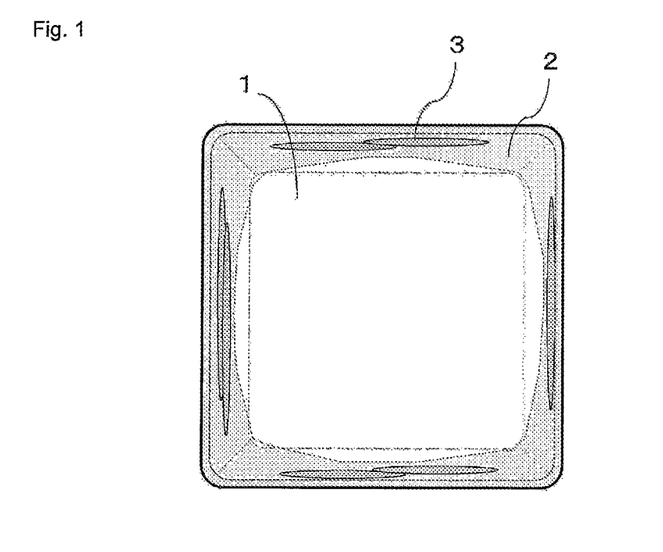
FIG. 1 shows a plastic box lunch container, which was evaluated for wrinkles of the film after shrinking.
Figure 2:
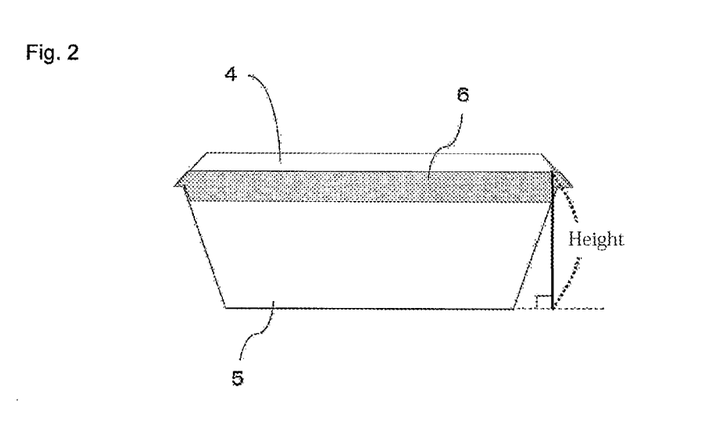
FIG. 2 shows a plastic box lunch container, which was evaluated for strains of the film after shrinking.

A film of 50 mm in width was wrapped around a plastic container (side: 150×150 mm, height: 100 mm) of a box lunch so as to bundle the body part and the lid part of the container such that the circumferential direction of the container corresponds to the shrinkage direction of the film. After fusion-sealing at 220° C., the film was heat-shrunk to the plastic container of a box lunch in a shrink tunnel of a preset temperature of 90° C. For shrinkage finishing property, evaluation was made on two points of wrinkles and strain. As to the evaluation of wrinkles, as shown in FIG. 2, the judgement was made based on the number of wrinkles of 5 cm or more in length formed in the side direction of the box lunch container. The criteria were as follows.

Good: 0 to 4 wrinkles
Fair: 5 to 14 wrinkles
Poor: 15 or more wrinkles

FIG. 3 shows a side view of the banding film and the box lunch container after shrinking. With regard to a strain of the box lunch container after shrinking, the distance from the floor on which the box lunch container was placed to the edge of the banding film was defined as a height "H", and when the height "H" was measured at 5 mm pitch in the circumferential direction of the box lunch container, the difference between the maximum value Hmax and the minimum value Hmin of the heights was defined as "R". One having a large "R" was judged as having a large strain. The criteria were as follows.

Good: 0 mm≤R<5 mm
Fair: 5 mm≤R<10 mm
Poor: 10 mm≤R

<Preparation of Polyester Raw Material>

Synthetic Example 1

100 mol % of dimethyl terephthalate (DMT) as a dicarboxylic acid component and 100 mol % of ethylene glycol (EG) as a polyhydric alcohol component were placed in a stainless steel autoclave equipped with a stirrer, a thermometer and a partially circulating cooler such that the amount of ethylene glycol was 2.2 times the amount of dimethyl terephthalate in terms of the molar ratio, 0.05 mol % (based on the acid component) of zinc acetate was added as an ester exchange catalyst, 0.225 mol % (based on the acid component) of antimony trioxide was added as a polycondensation catalyst, and an ester exchange reaction was carried out while distilling away generated methanol to outside the system. Thereafter, a polycondensation reaction was carried out at 280° C. under a reduced pressure of 26.7 Pa to obtain polyester 1 having an intrinsic viscosity of 0.75 dl/g. The composition is shown in Table 1.

Synthetic Examples 2 to 4

Polyesters 2 to 4 shown in Table 1 were prepared in the same manner as in Synthetic Example 1. In the production of polyester 2, SiO2 (Silysia 266, manufactured by FUJI SILYSIA CHEMICAL LTD.; average particle diameter: 1.5 µm) was added as a lubricant at a proportion of 7,200 ppm relative to the polyester. In the Table, NPG is neopentyl glycol, BD is 1,4-butanediol, and DEG is diethylene glycol, which is a side product. The intrinsic viscosities of polyesters 2, 3 and 4 were 2: 0.75 dl/g, 3: 1.20 dl/g and 4: 1.20 dl/g, respectively. Each polyester was appropriately formed into a chip.

Example 1

Polyester 1, polyester 2, polyester 3 and polyester 4 as described above were mixed in the mass ratio of 25:5:60:10 and the mixed resin A was introduced into an extruder. Then the mixed resin was molten at 280° C. and extruded front a T-die and then quenched by winding it around a rotating metal roll set at a surface temperature of 30° C. to obtain an undrawn film with a thickness of 42 µm. Tg of the undrawn film was 75° C. The obtained undrawn film was introduced to a lengthwise drawing machine in which a plurality of rolls were continuously disposed, heated till the film temperature reached 80° C. on a preheating roll, and then lengthwise drawn by a first stage drawing as a roll drawing method at the draw ratio in the longitudinal direction of 3.5 times so as to allow the thickness of the film after drawing to be 12 µm. The drawing distance at this stage was 31 mm. After lengthwise drawing, the film was cooled by a cooling roll whose surface temperature was set to 25° C., and then wound as a roll. The resulting film was evaluated for various properties in the above-mentioned manner. The evaluation results are shown in Table 3. As a result of the evaluation, the film had adequate shrinkage property and good shrinkage finishing property.

TABLE 1

| Polyester raw material | composition of polyester raw material (mol %) | | | | | addition amount of lubricant |
|---|---|---|---|---|---|---|
| | acid component | polyhydric alcohol component | | | | |
| | TPA | EG | BD | NPG | DEG | |
| 1 | 100 | 99 | — | — | 1 | |
| 2 | 100 | 99 | — | — | 1 | 7200 |
| 3 | 100 | 68 | — | 30 | 2 | |
| 4 | 100 | — | 100 | — | — | |

TABLE 2

| mixed raw material | ratio of polyester raw material (wt %) | | | |
|---|---|---|---|---|
| | 1 | 2 | 3 | 4 |
| A | 25 | 5 | 60 | 10 |
| B | 70 | 5 | 25 | 0 |
| C | 5 | 5 | 66 | 24 |

TABLE 3

| | | Example 1 | Example 2 | Example 3 | Example 4 | Example 5 | Example 6 | Example 7 |
|---|---|---|---|---|---|---|---|---|
| raw material | layer structure | single layer | single layer | single layer | single layer | single layer | single layer | single layer |
| | core layer | A | A | A | A | A | A | A |
| | skin layer | | | | | | | |
| | ratio of skin/core | — | — | — | — | — | — | — |
| MD draw condition | heating method | | | | roll method | | | |
| | number of draw stage | 1 | 1 | 1 | 1 | 2 | 2 | 2 |
| | first stage draw ratio | 3.5 | 4.5 | 5.5 | 6 | 1.3 | 1.5 | 1.9 |
| | first stage drawing distance (mm) | 31 | 31 | 31 | 31 | 160 | 160 | 160 |
| | second stage draw ratio | — | — | — | — | 2.7 | 3.0 | 2.9 |
| | second stage drawing distance (mm) | — | — | — | — | 31 | 31 | 31 |
| | total draw ratio in drawing | 3.5 | 4.5 | 5.5 | 6 | 3.5 | 4.5 | 5.3 |
| film thickness(µm) | | 12 | 12 | 12 | 12 | 12 | 12 | 12 |
| Heat Shrinkage in hot water of 98° C. (%) | longitudinal direction | 70.0 | 72.1 | 60.1 | 56.9 | 68.0 | 70.2 | 68.0 |
| | width direction | 1.0 | 1.7 | 2.4 | 3.5 | 0.9 | 1.5 | 2.0 |
| Refractive index | longitudinal direction | 1.6230 | 1.6481 | 1.6732 | 1.8858 | 1.6219 | 1.6420 | 1.6545 |
| | width direction | 1.5562 | 1.5530 | 1.5505 | t.5494 | 1.5551 | 1.5520 | 1.5497 |
| | difference | 0.0668 | 0.0951 | 0.1227 | 0.1364 | 0.0668 | 0.0900 | 0.1048 |

TABLE 3-continued

| | | | | | | | | |
|---|---|---|---|---|---|---|---|---|
| variation in shrinkage in the width direction (%/50 cm) | | 2.1 | 2.3 | 2.4 | 3.7 | 2.2 | 2.4 | 3.6 |
| Absolute value of the molecular orientation angle in the width direction (°) | | 0.5 | 1.0 | 2.2 | 3.0 | 4.0 | 4.8 | 5.1 |
| Finising Property | wrinkle | Good | Good | Good | Good | Good | Good | Good |
| | strain | Good | Good | Good | Good | Good | Good | Good |

| | | Example 8 | Example 9 | Comparative Example 1 | Comparative Example 2 | Comparative Example 3 | Comparative Example 4 |
|---|---|---|---|---|---|---|---|
| raw material | layer structure | two-type two-layer | two-type three-layer | single layer | two-type two-layer | two-type three-layer | single layer |
| | core layer | C | C | A | C | C | A |
| | skin layer | B | B | | B | B | |
| | ratio of skin/core | 2/8 | 1/8/1 | — | 2/8 | 1/8/1 | — |
| MD draw condition | heating method | roll method | | IR heating | | | roll method |
| | number of draw stage | 1 | 1 | 1 | 1 | 1 | 1 |
| | first stage draw ratio | 4.5 | 4.5 | 4.5 | 4.5 | 4.5 | 4.5 |
| | Drawing distance (mm) | 31 | 31 | 300 | 300 | 300 | 250 |
| | second stage draw ratio | — | — | — | — | — | — |
| | Drawing distance (mm) | — | — | — | — | — | — |
| | total draw ratio in drawing | 4.5 | 4.5 | 4.5 | 4.5 | 4.5 | 4.5 |
| film thickness (μm) | | 12 | 12 | 12 | 12 | 12 | 12 |
| Heat Shrinkage in hot water of 98° C. | longitudinal direction | 74.0 | 71.8 | 70.2 | 76.1 | 76.8 | 70.2 |
| | width direction. | 2.9 | 2.1 | 0.9 | −0.2 | −0.3 | 0.9 |
| Refractive Index | longitudinal direction | 1.6372 | 1.6307 | 1.6511 | 1.6410 | 1.6408 | 1.6511 |
| | width direction | 1.5482 | 1.5466 | 1.5792 | 1.5388 | 1.5384 | 1.5792 |
| | difference | 0.0899 | 0.0841 | 0.0719 | 0.1022 | 0.1024 | 0.0719 |
| Variation in shrinkage in the width direction (%/50 cm) | | 2.0 | 2.3 | 6.3 | 7.0 | 7.1 | 6.3 |
| absolute value of the molecular orientation angle in the width direction (°) | | 1.1 | 1.0 | 21.0 | 23.0 | 22.0 | 18.0 |
| Finising Property | wrinkle | Good | Good | Poor | Poor | Poor | Fair |
| | strain | Good | Good | Poor | Poor | Poor | Fair |

Example 2

A film was produced in the same manner as that in Example 1 except that the draw ratio in the longitudinal direction was set to 4.5 times, and the amount of the molten mixed resin extruded from a T-die was adjusted so as to allow the thickness of the film after drawing in the longitudinal direction to be 12 μm. As a result of the evaluation, the film had adequate shrinkage property and good shrinkage finishing property.

Example 3

A film was produced in the same manner as that in Example 1 except that the draw ratio in the longitudinal direction was set to 5.5 times, and the amount of the molten mixed resin extruded from a T-die was adjusted so as to allow the thickness of the film after drawing in the longitudinal direction to be 12 μm. As a result of the evaluation, the film had adequate shrinkage property and good shrinkage finishing property.

Example 4

A film was produced in the same manner as that in Example 1 except that the draw ratio in the longitudinal direction was set to 6 times, and the amount of the molten mixed resin extruded from a T-die was adjusted so as to allow the thickness of the film after drawing in the longitudinal direction to be 12 μm. As a result of the evaluation, the film had adequate shrinkage property and good shrinkage finishing property.

Example 5

A film was produced in the same manner as that in Example 1 except that two-stage drawing was adopted as a roll drawing method, the first stage drawing was performed at the draw ratio of 1.3 times, and the second stage drawing was performed at the draw ratio of 2.7 times. The drawing distance at the first stage was 160 mm and the drawing distance at the second stage was 31 mm.

Example 6

A film was produced in the same manner as that, in Example 2 except that two-stage drawing was adopted as a roll drawing method, the first stage drawing was performed at the draw ratio of 1.5 times, and the second stage drawing was performed at the draw ratio of 3.0 times. The drawing distance at the first stage was 160 mm and the drawing distance at the second stage was 31 mm. As a result of the evaluation, the film had adequate shrinkage property and good shrinkage finishing property.

Example 7

A film was produced in the same manner as that in Example 3 except that two-stage drawing was adopted as a roll drawing method, the first stage drawing was performed at the draw ratio of 1.9 times, and the second stage drawing was performed at the draw ratio of 2.9 times. The drawing distance at the first stage was 160 mm and the drawing distance at the second stage was 31 mm. As a result of the evaluation, the film had adequate shrinkage property and good shrinkage finishing property.

Example 8

Polyester 1, polyester 2, and polyester 3 as described above were mixed in the mass ratio of 70:5:25 (mixed resin B) to prepare a mixed resin for a skin layer. Polyester 1, polyester 2, polyester 3 and polyester 4 as described above were mixed in the mass ratio of 5:5:66:24 (mixed resin C) to prepare a mixed resin for a core layer. The mixed resin for a skin layer and the mixed resin for a core layer were co-extruded at a temperature of 280° C. using a T-die mold equipped with a two-layer multi-manifold using two biaxial extruders, and rapidly quenched with a cooling roll to produce a two-layered sheet of a skin layer/a core layer. At this time, the mixed resins were co-extruded such that the thickness ratio of the skin layer and the core layer was the skin layer:the core layer=2:8. Next, the obtained sheet was heated to 80° C., and then lengthwise drawn by a first stage drawing as a roll drawing method at the draw ratio in the longitudinal direction of 4.5 times so as to allow the entire thickness of the film after drawing to be 12 μm. The drawing distance at this stage was 31 mm. The film after lengthwise drawing was cooled by a cooling roll, and then wound as a roll. The resulting film was evaluated for various properties in the above-mentioned manner. The evaluation results are shown in Table 3. As a result of the evaluation, the film had adequate shrinkage property and good shrinkage finishing property.

Example 9

Polyester 1, polyester 2, and polyester 3 as described above were mixed in the mass ratio of 70:5:25 (mixed resin B) to prepare a mixed resin for a skin layer. Polyester 1, polyester 2, polyester 3 and polyester 4 as described above were mixed in the mass ratio of 5:5:66:24 (mixed resin C) to prepare a mixed resin for a core layer. The mixed resin for a skin layer and the mixed resin for a core layer were co-extruded at a temperature of 280° C. using a T-die mold equipped with a three-layer multi-manifold using two biaxial extruders, and rapidly quenched with a cooling roll to produce a three-layered sheet of a skin layer/a core layer/a skin layer. At this time, the mixed resins were co-extruded such that the thickness ratio of the skin layer and the core layer was the skin layer:the core layer:the skin layer=1:8:1. Next, the obtained sheet was heated to 80° C., and then lengthwise drawn by a first stage drawing as a roll drawing method at the draw ratio in the longitudinal direction of 4.5 times so as to allow the entire thickness of the film after drawing to be 12 μm. The drawing distance at this stage was 31 mm. The film after lengthwise drawing was cooled by a cooling roll, and then wound as a roll. The resulting film was evaluated for various properties in the above-mentioned manner. The evaluation results are shown in Table 3. As a result of the evaluation, the film had adequate shrinkage property and good shrinkage finishing property.

Comparative Example 1

A film was produced in the same manner as that in Example 1 except that the film was heated till the film temperature reached 75° C. on the preheating roll, and then while heating the film between the low speed roll and the high-speed roll with an infrared heater, the film was lengthwise drawn at the draw ratio of 4.5 times in the longitudinal direction using the speed difference between the rolls so as to allow the thickness of the film after drawing to be 12 μm. The drawing distance at this stage was 300 mm. As a result of the evaluation, the film had a large variation in shrinkage in the width direction, wrinkles were generated and strains occurred on the banding film after shrinking, and thus the film had poor finishing property.

Comparative Example 2

A film was produced in the same manner as that in Example 8 except that the film was heated till the film temperature reached 75° C. on the preheating roll, and then while heating the film between the low-speed roll and the high-speed roll with an infrared heater, the film was lengthwise drawn at the draw ratio of 4.5 times in the longitudinal direction using the speed difference between the rolls so as to allow the thickness of the film after draw ing to be 12 μm. The drawing distance at this stage was 300 mm. As a result of the evaluation, the film had a large variation in shrinkage in the width direction, wrinkles were generated and strains occurred on the banding film after shrinking, and thus the film had poor finishing property.

Comparative Example 3

A film was produced in the same manner as that in Example 9 except that the film was heated till the film temperature reached 75° C. on the preheating roll, and then while heating the film between the low-speed roll and the high-speed roll with an infrared heater, the film was lengthwise drawn at the draw ratio of 4.5 times in the longitudinal direction using the speed difference between the rolls so as to allow the thickness of the film after drawing to be 12 μm. The drawing distance at this stage was 300 mm. As a result of the evaluation, the film had a large variation in shrinkage in the width direction, wrinkles were generated and strains occurred on the banding film after shrinking, and thus the film had poor finishing property.

Comparative Example 4

A film was produced in the same manner as that in Example 2 except that the drawing distance was 250 mm. As a result of the evaluation, the film had a large variation in shrinkage in the width direction, wrinkles were generated and strains occurred on the banding film after shrinking, and thus the film had poor finishing property.

INDUSTRIAL APPLICABILITY

The heat-shrinkable polyester film of the present invention has excellent, properties as describe above and thus can be used suitably as a label application and a banding application to bind a box lunch container or the like. A package such as a bottle obtained by using the heat-shrink-

The invention claimed is:

1. A heat-shrinkable polyester film which satisfies the following requirements (1) to (4):
   (1) a hot-water shrinkage of 50% or more in a main shrinkage direction of the film when treated for 10 seconds in hot water of 98° C.;
   (2) when samples are taken at every 100 mm in a width direction of the film, and hot-water shrinkages in a direction orthogonal to the main shrinkage direction of the film are determined for all the samples when treated for 10 seconds in hot water of 98° C., a variation of the hot-water shrinkages is 5% or less;
   (3) an absolute value of a molecular orientation angle is 15 degrees or less; and
   (4) a refractive index difference represented by the following equation is 0.06 or more:
   Refractive index difference=(Refractive index in the main shrinkage direction)−(Refractive index in a direction orthogonal to the main shrinkage direction),
   wherein the heat-shrinkage polyester film is prepared from a polyester raw material resin comprising
   (A) 50-90 mol % of an ethylene terephthalate unit in 100 mol % of constituent units of a polyester,
   (B) diol components constituting the polyester include at least one selected from an aliphatic diol, an alicyclic diol, and an aromatic diol, and
   (C) 2-50 mol % of an amorphous monomer component in 100 mol % of a polyhydric alcohol component or in 100 mol % of a polybasic carboxylic acid component in the whole polyester resin,
   wherein the amorphous monomer component is selected from neopentyl glycol, 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, hexanediol, and combinations thereof, and
   wherein the polyester raw material resin does not contain polybasic carboxylic acids of tribasic or more,
   wherein the polyester film is obtained by uniaxial drawing 2.5 times or more and 7 times or less in the longitudinal direction,
   wherein the polyester film has a main shrinkage direction in a longitudinal direction of the film, and
   wherein a cumulative drawing distance of a drawing distance at a first stage and a drawing distance at a second stage in the preparation of the polyester film is 200 mm or less.

2. The heat-shrinkable polyester film according to claim 1, wherein the amorphous monomer component is at least one of neopentyl glycol, cyclohexanedimethanol and isophthalic acid.

3. A package comprising a label obtained from the heat-shrinkable polyester film according to claim 1 on at least a part of an outer periphery of an object to be packaged.

4. A package comprising a label obtained from the heat-shrinkable polyester film according to claim 2 on at least a part of an outer periphery of an object to be packaged.

* * * * *